March 20, 1962     J. C. BERTRAM     3,026,008
HANDLE
Filed Nov. 16, 1959     2 Sheets-Sheet 1
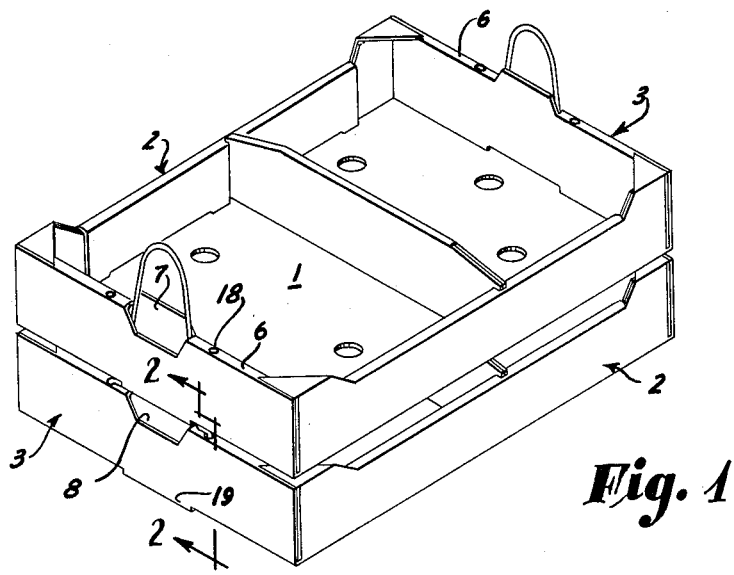
Fig. 1
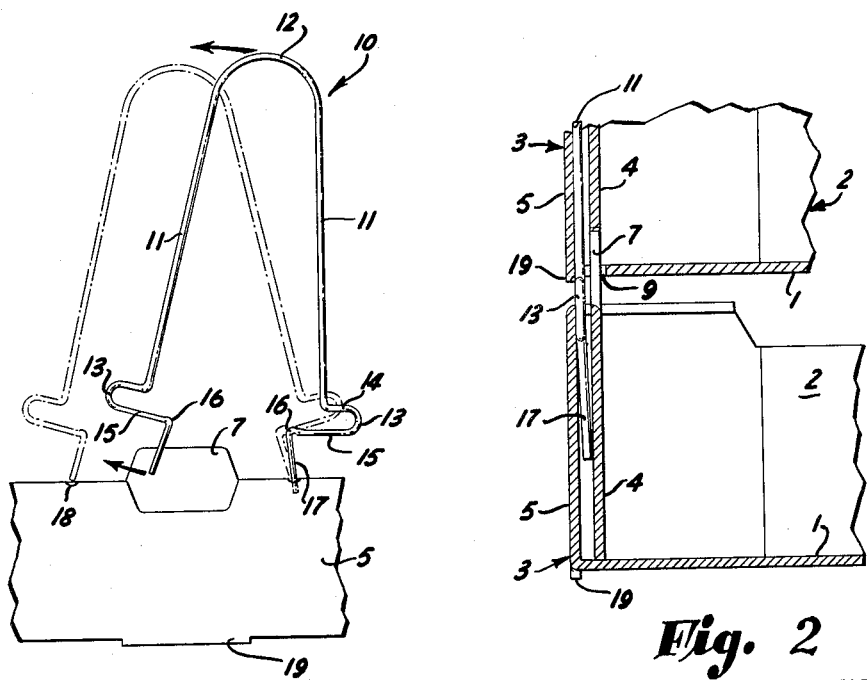
Fig. 4
Fig. 2
INVENTOR.
JOHN C. BERTRAM
BY
Beau, Brooks, Buckley & Beau 3,026,008
HANDLE
John C. Bertram, Mayville, N.Y., assignor to Bertram
Wire Products, Inc., Buffalo, N.Y.
Filed Nov. 16, 1959, Ser. No. 853,264
3 Claims. (Cl. 224—45)

This invention relates generally to the handle art, and more particularly to a new and useful lifting handle for containers such as trays of a type adapted to be stacked.

The primary object of my invention is to provide a handle of a type adapted to be attached to a tray and to extend through a superposed tray, whereby a pair of such handles can be used to lift two such trays, which handle is more easily and quickly assembled to the tray, is more surely held against undesired disengagement from the tray, and is less expensive, all as contrasted with prior art handles.

A handle constructed in accord with my invention is characterized in one aspect thereof by the provision of a unitary wire member of elongated, normally inverted generally U-shape having side leg portions joined by a bight portion and defining therewith the plane of the handle, the side leg portions normally diverging outwardly from the bight portion and terminating in inwardly facing loops substantially lying in the plane of the handle, each loop having a first arm extending generally perpendicularly from the associated side leg portion and a second arm extending inwardly beyond the juncture of the first arm with its side leg portion, with each second arm terminating in shoulder means projecting toward the bight portion, and the outer ends of the handle extending from the inner ends of the second arms.

The foregoing and other objects, advantages and characterizing features of a handle constructed in accord with my invention will become clearly apparent from the ensuing detailed description of a presently preferred embodiment thereof, taken in conjunction with the accompanying drawings illustrating such embodiment wherein like reference numerals denote like parts throughout the various views and wherein:

FIG. 1 is a perspective view of a pair of handles of my invention attached to a stacking tray and projecting through a superposed tray, for lifting both trays;

FIG. 2 is a fragmentary sectional view thereof on an enlarged scale, taken about on line II—II of FIG. 1;

FIG. 4 is a somewhat schematic view, on a reduced scale, illustrating the manner of assembling the handle of my invention to the tray.

Figure 3:
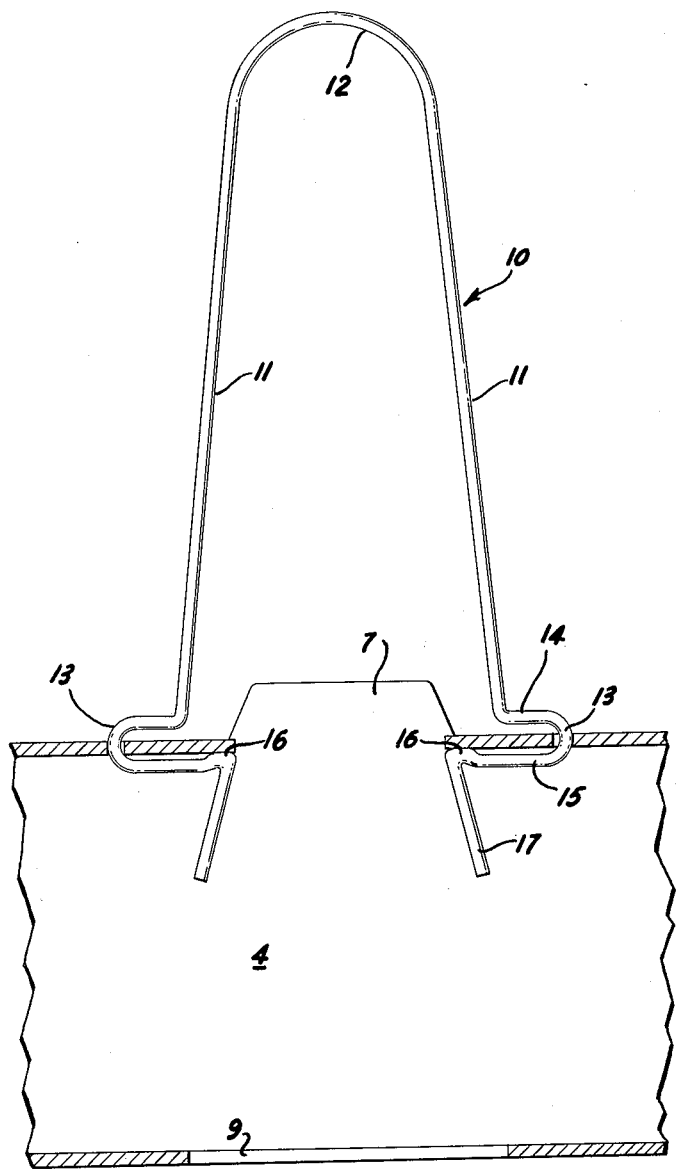
FIG. 3 is a fragmentary, sectional view thereof taken about at right angles to FIG. 2 and with the superposed tray removed.

While the handle of my invention will find utility with containers of a number of different designs there is shown in the accompanying drawings, for purposes of illustration only, a commercially available stacking tray which is per se no part of my invention. Such a tray is provided with a bottom wall 1, side walls 2 and end walls 3, which latter comprise spaced inner and outer wall sections 4 and 5, respectively, joined across the top thereof by a horizontal ledge 6. Each end wall 3 is cut out to provide a tab 7 projecting upwardly from the inner wall section 4, leaving an elongated slot or opening 8 in ledge 6, and the bottom wall 1 is slotted at 9 in vertical alinement with the slots 8.

The presently preferred form of handle of my invention is designated generally at 10, and is elongated, normally in a vertical direction, comprising a unitary member of wire or other suitable material. Member 10 is of inverted U-shape having a pair of side leg portions 11 of major extent, joined to and normally diverging outwardly from a bight portion 12. At their outer ends, the major side leg portions 11 terminate in opposed, inwardly facing loops 13 each comprising a first arm 14 preferably extending generally normal to the associated side leg 11 and a second arm 15 generally parallel to the arm 14 and spaced outwardly therefrom and from the side leg portion 11. The arms 15 project inwardly substantially beyond the junctures of the major side leg portions 11 and the arms 14, so that said junctures are alined generally centrally of the arms 15, and are formed adjacent their inner end to provide shoulders 16 which project toward the bight portion 12, to comprise normally upstanding shoulders. Side leg portions 17 of minor extent, relative to the major side leg portions 11, preferably diverge outwardly from the loops 13 to comprise the outer ends of the handle.

The tray ledges 6 are provided on opposite sides of the slots 8 with openings 18 adapted to receive the outer ends 17 and loops 13 of my handle 10. When assembling the handle 10 to a tray it is necessary that the handle ends 17 be spread apart, as indicated in FIG. 4, because the tray holes 18 are spaced apart further than the normal spacing of the outer extremities of the handle ends 17. The handle resiliently yields to permit spreading apart of the ends, which is readily accomplished with one hand because it is necessary only to insert one end 17 and then spread the side legs apart far enough to insert the opposite end 17. Then, because of the outwardly diverging inclination of the ends 17, the handle can be simply pushed downwardly and the ends 17 will cam the handle side legs further apart as required to permit the full insertion of the ends 17. Then the side legs 11 are squeezed to snap the shoulders 16 through the openings 18, thereby to bring the loops 13 into proper assembled position relative to the tray, with the second arms 15 positioned beneath the ledges 6 and the first arms 14 positioned thereabove as illustrated in FIG. 3. The spreading apart of the handle side legs, as the handle is pushed downwardly, inclines the arms 15 relative to ledge 6 and thereby positions shoulders 16 to pass through openings 18 and beneath ledge 6 upon squeezing legs 11 together.

When thus assembled to the tray, the handles 10 stand upright, so that the major side leg portions 11 and the bight portions 12 can project through the bottom wall slots 9 and top ledge slots 8 of a superposed tray, in the manner illustrated in FIG. 1.

The shoulders 16 are spaced inwardly of the junctures between the arms 14 and side leg portions 11, to provide load bearing arms 15 of considerable length. This provides a relatively large bearing surface over which the load is distributed, and the shoulders 16 bear against the under side of ledge 6 and space the remainder of the arms 15 substantially therebelow, as clearly illustrated in FIG. 3, to insure against inadvertent disassembly of the handle from the tray. In this regard, it will be noted that the arms 14 and 15 of loops 13 can be spaced apart a distance substantially greater than the thickness of the material comprising ledges 6, thereby to make the assembly of the handle to the tray faster and easier and to accommodate ledge material of different thicknesses. With my handle, it is not necessary that the loop arms have a predetermined spacing, relative to the ledge material, so as to grip the same, because the shoulders 16 which bear against the ledge 6 space the major portions of the arms 15 therebelow, whereby the loops will not accidentally slip out of the openings 18 despite the relatively large spacing between the arms 14, 15. The shoulders, without more, lock the handle to the basket with such strength that, upon lifting the handle will tear a standard basket before it will slip out. Further, the positioning of the junctures of side legs 11 and arms 14 generally centrally of the lower arms 15 provides better balance, in that when the handles 10 are lifted the load carried by the lower arms 15, representing the load of the lower tray, is balanced relative to the side leg portions 11.

In lieu of shoulders 16 formed out of arms 15, the latter could be inclined upwardly and inwardly with the elevated inner ends thereof, adjacent ends 17, comprising and functioning as locking shoulders.

While the handle ends could be parallel, or converge, that is not preferred because assembly of the handle to the tray is facilitated by the outwardly diverging minor side legs or ends 17, which compensate for the relatively close spacing of shoulders 16 by reducing the extent to which the handle otherwise would have to be spread to insert the handle ends in the openings 18. The smooth, inclined or converging surfaces of ends 17 act as cam surfaces to spread the side legs apart merely upon pressing downwardly on the handle. Also, the diverging ends provide greater stability, by providing a greater spread at the outer ends of the handle than is provided between the shoulders 16.

For further stability in a direction generally at right angles to the plane of the handle, one, and if desired both, of the ends 17 can be canted out of that plane, so that the handle bears against one of the end wall sections 4, 5 adjacent shoulder 16, and at its outer end it bears against the other of said sections, as clearly illustrated in FIG. 2. If both ends are canted, that will be done in opposite directions. Such canting leaves a relatively straight but inclined end, is relatively easily provided, and requires a minimum of material for the stabilizing result which is produced.

Part 19 is a depending tab left upon forming slot 9 of the tray which, as previously noted, is per se no part of my invention.

Accordingly, it is seen that my invention fully accomplishes its intended objects. While only a presently preferred embodiment of the handle of my invention has been disclosed and described in detail herein, it will be appreciated that such disclosure is intended to be by way of illustration only, and that my invention is not limited to such embodiment but comprehends all modifications thereof and variations therein which fall within the scope of the appended claims.

Having fully disclosed and completely described my invention, together with its mode of operation, what I claim as new is:

1. A handle for stacking trays and the like comprising, a unitary wire member of elongated normally inverted generally U-shape having a pair of side leg portions of major extent joined by a bight portion and defining therewith the plane of said handle, said major side leg portions normally diverging outwardly from said bight portion and each terminating in an inwardly facing loop substantially lying in said plane, said loops each having a first arm extending generally perpendicularly from the associated major side leg portion and a second arm spaced from said first arm and from said major side leg portion, each of said second arms extending inwardly beyond the junctures of said first arms and said major side leg portions with the inner ends of said second arms displaced toward said bight portion, and side leg portions, of minor extent extending from the inner ends of said second arms away from said bight portion.

2. A handle as set forth in claim 1, wherein at least one of said minor side leg portions is canted out of said plane.

3. A handle as set forth in claim 1, wherein said minor side leg portions diverge outwardly.

References Cited in the file of this patent

UNITED STATES PATENTS

| | | |
|---|---|---|
| 686,841 | Bertels | Nov. 19, 1901 |
| 2,285,399 | Arneson | June 5, 1942 |
| 2,287,731 | Franks et al. | Jan. 23, 1942 |
| 2,667,995 | Bruce | Feb. 2, 1954 |